United States Patent [19]

Harvey et al.

[11] 4,360,729
[45] Nov. 23, 1982

[54] SEISMIC CABLE CONNECTOR WITH OPTICAL TRANSCEIVER

[75] Inventors: Donald W. Harvey, Missouri City; Donald J. Bacha, Houston, both of Tex.

[73] Assignee: Geosource Inc., Houston, Tex.

[21] Appl. No.: 207,635

[22] Filed: Nov. 17, 1980

[51] Int. Cl.³ .............................................. G01V 1/22
[52] U.S. Cl. .................................... 250/227; 367/76; 367/78; 367/79
[58] Field of Search ........................... 367/76, 78, 79; 340/152 T; 250/227, 551; 455/608, 612

[56] References Cited

U.S. PATENT DOCUMENTS

| | | | |
|---|---|---|---|
| 3,792,284 | 2/1974 | Kaelin | 250/551 |
| 3,877,052 | 4/1975 | Dixon et al. | 357/17 |
| 3,968,564 | 7/1976 | Springthorpe | 29/580 |
| 3,995,935 | 12/1976 | McCartney | 350/96 C |
| 4,072,399 | 2/1978 | Love | 350/96.16 |
| 4,092,061 | 5/1978 | Stigliani, Jr. | 350/96.18 |
| 4,117,448 | 9/1978 | Siems | 367/79 |
| 4,118,100 | 10/1978 | Goell et al. | 350/96.20 |
| 4,130,343 | 12/1978 | Miller et al. | 350/96.15 |

OTHER PUBLICATIONS

"Fiber-Optic Data Transmission: A Practical, Low-Cost Technology," *Electronics* (Sep. 2, 1976).
"High Radiance Light Emitting Diode As Optical Fiber Transmission Line Sources," *Review of the Electrical Communication Laboratories*, (vol. 24, Nos. 3-4, Mar.-Apr. 1976).
3M New Product Bulletin, 3M Brand Fiber Optic Data Link.

*Primary Examiner*—David C. Nelms
*Assistant Examiner*—Darwin R. Hostetter
*Attorney, Agent, or Firm*—Arnold, White & Durkee

[57] ABSTRACT

A seismic cable connector is provided for use with a dual fiber cable in a fiber optic seismic exploration system. The connector contains a digital transceiver which includes an optical detector connected to one fiber of the cable and a fiber optic transmitter connected to the other fiber. The digital transceiver is housed in an environmentally sealed case to protect the transceiver and the ends of the optical fibers from being affected or damaged during use in the field. The transceiver is activated by transistor-transistor logic contained within the connector. The optical fibers are protected by buffer tubes extending the length of the cable. A sixty-one pin electrical plug is provided in the cable connector for mating the connector with remote seismic data gathering units.

9 Claims, 10 Drawing Figures

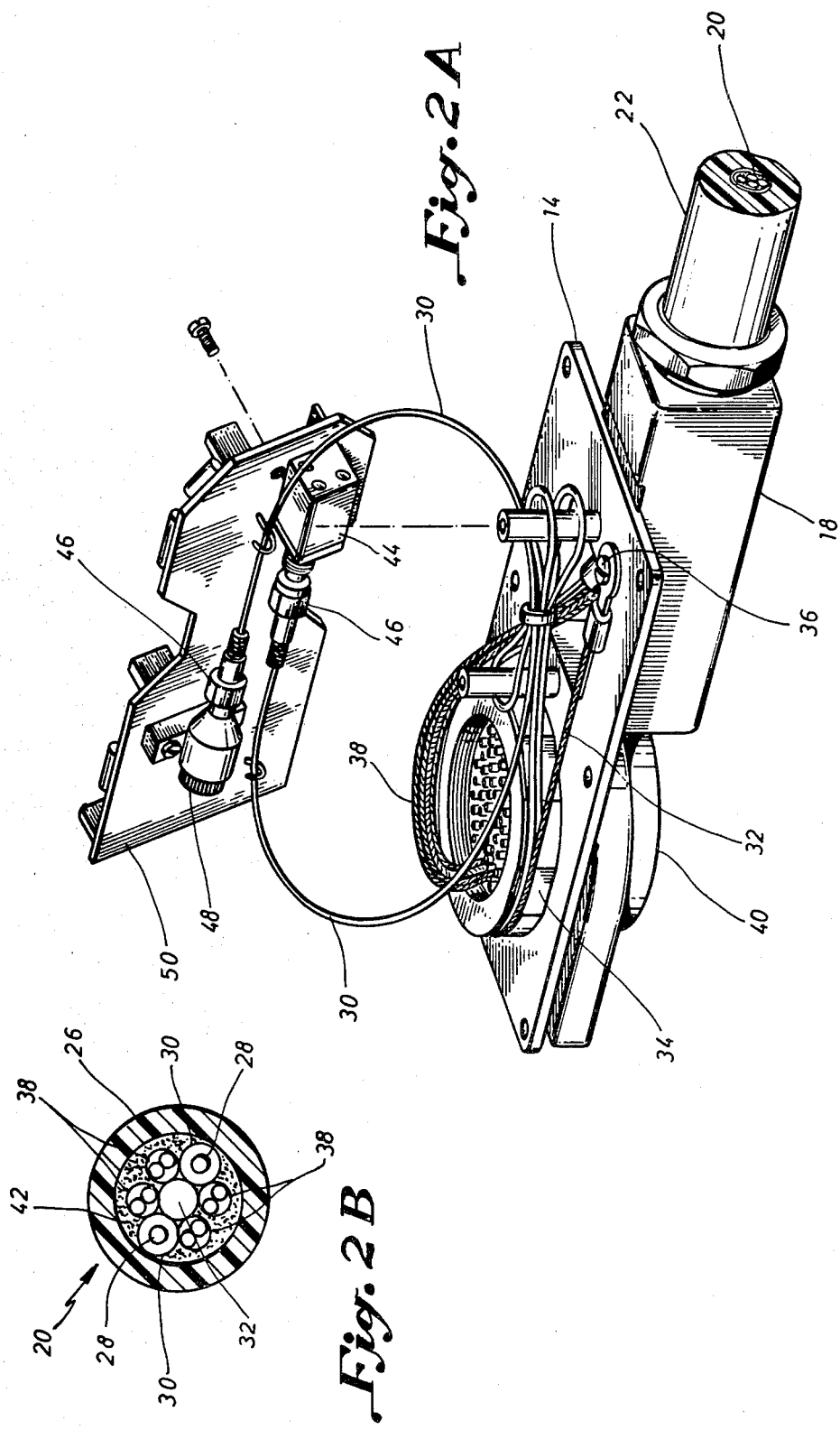

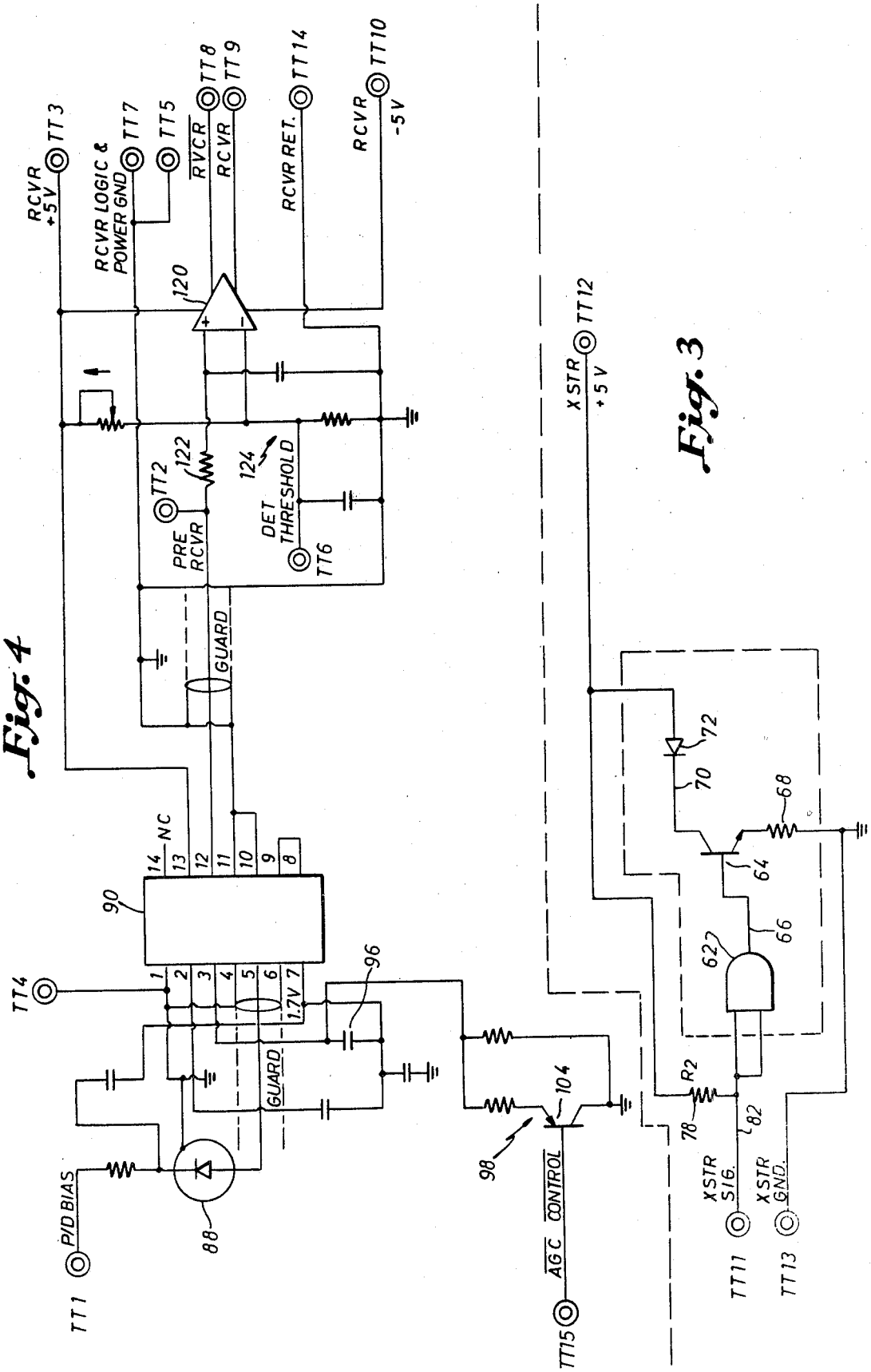

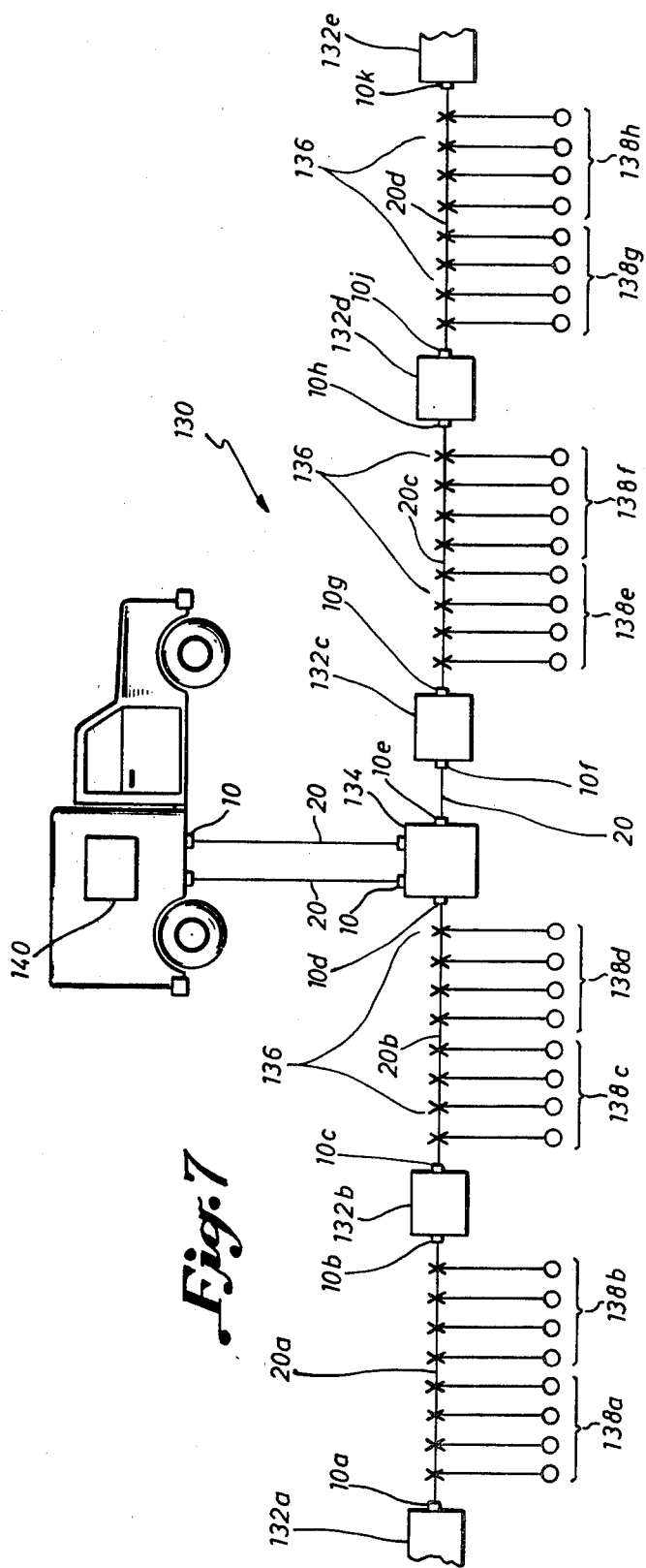
Fig. 7
Fig. 5A
Fig. 5B
Fig. 5C
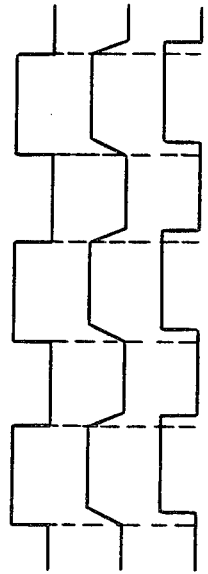

SEISMIC CABLE CONNECTOR WITH OPTICAL TRANSCEIVER

BACKGROUND OF THE INVENTION

The invention relates generally to seismic exploration systems and, more particularly, to fiber optic seismic exploration systems.

In conventional seismic exploration systems, several hundred to a thousand seismic sensor groups, each composed of one or more individual sensors or geophones, are utilized to obtain seismic data. Usually a sensor group will contain one to thirty geophones electrically interconnected to form a single data channel. Conventional systems utilize a multiconductor seismic cable containing many conductor pairs, one pair for each sensor group, to transmit the seismic data from the sensor groups to a multichannel data processing and recording unit. As these conventional cables are extremely heavy and bulky, handling of such cables is very time consuming and, therefore, very expensive.

Recently, the use of fiber optics as a telemetry link for remotely distributed seismic systems has been suggested, for example, see U.S. Pat. No. 4,117,448 to Siems. Siems discloses a fiber optic cable with a set of triple-redundant optical fibers. The fibers are terminated at each end by a cable connector housing a light emitting diode (LED) and a photodetector. Siems suggests the transmission of digital data over the optical fibers. However, as the LED driver circuit and the photodetector amplification circuit are housed within the remote seismic data gathering unit to which the connector is electrically connected, the digital data is not logic compatible. In other words, the signal amplitude of the digital data is much too low to interface directly with standard logic families, such as transistor-transistor logic (TTL), complimentary metal-oxide semiconductor logic (CMOS), and emitter-coupled logic (ECL). Utilization of the arrangement disclosed in Siems is apparently not practical, as the digital data may become attenuated and distorted due to line capacitance, circuit loading, and RFI/EMI pick-up. Such effect results in costly, inaccurate, and unuseful data gathering.

It would be advantageous to provide a standardized seismic cable connector/transceiver which has practical application in a field environment. It would also be advantageous to provide a connector/transceiver which uses digital signal transmission to avoid irreparable attenuation and distortion of control and data signals. These useful results have been achieved by the present invention.

SUMMARY OF THE INVENTION

In accordance with the present invention, there is provided a seismic cable connector which includes a digital, logic compatible optical transceiver for use with a dual fiber optical cable. The digital transceiver is housed in an environmentally sealed case which protects the transceiver and the ends of the optical fibers.

In a presently preferred embodiment, the digital transceiver has an optical detector connected to one of the optical fibers and a fiber optic transmitter connected to the other optical fiber. The optical detector includes a photodiode and a fiber optic receiver integrated circuit. The fiber optic transmitter includes a light emitting diode and digital driver. The receiver integrated circuit includes an automatic gain control circuit, and a symmetry restoration circuit is provided to correct the duration of the digital pulses output from the receiver integrated circuit.

In a presently preferred embodiment, the cable connector has a sixty-one pin electrical plug and a self-locking wrench for easily connecting or disconnecting the fiber optic cable to a remote seismic data gathering unit.

These and other advantages and features of the present invention will hereinafter appear, and for purposes of illustration but not of limitation, an exemplary embodiment of the present invention is shown in the appended drawings and described in the following detailed description.

BRIEF DESCRIPTION OF THE DRAWINGS

FIG. 2A is an exploded view of the connector/transceiver of FIG. 1.

FIG. 2B is an enlarged cross-sectional view of the fiber optic cable which is used with the connector/transceiver of FIG. 1.

FIG. 3 is an electrical schematic of the fiber optic transmitter circuit which is used in the connector/transceiver of FIG. 1.

FIG. 4 is an electrical schematic of the optical detector circuit which is used in the connector/transceiver of FIG. 1.

FIGS. 5A, 5B, and 5C are illustrative digital signals transmitted by the connector/transceiver of FIG. 1.

FIG. 7 is a block diagram of a seismic exploration system which uses the connector/transceiver of FIG. 1.

DESCRIPTION OF THE PRESENTLY PREFERRED EMBODIMENT

Figure 1:
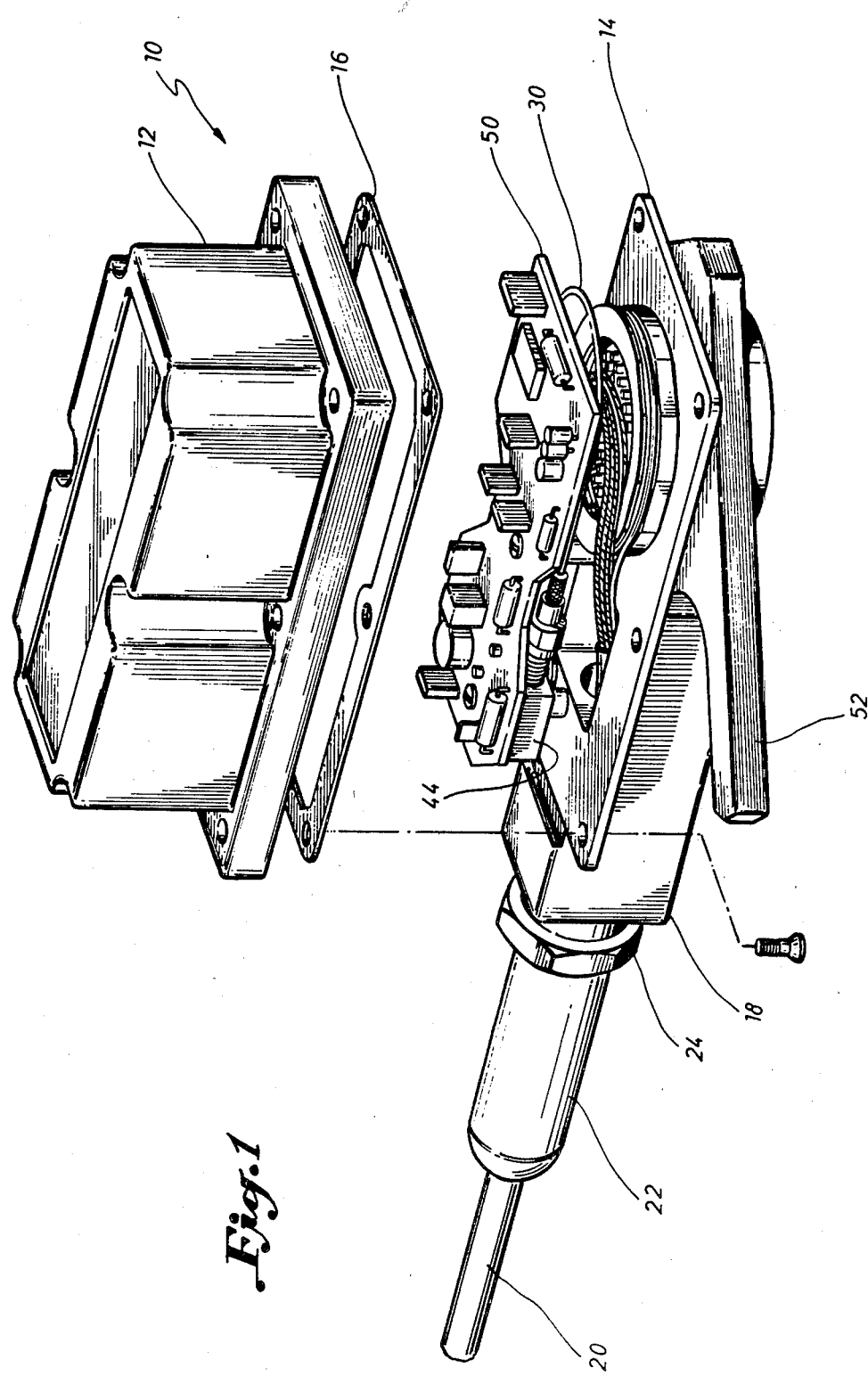
FIG. 1 is an isometric view of a seismic cable connector/transceiver with the cover removed in accordance with the present invention.

Throughout the following description, similar reference numerals refer to similar elements in all figures of the drawings.

Referring to FIGS. 1 and 2, shown is a seismic cable connector/transceiver 10 of the present invention. The connector 10 has a shell or cover 12 which attaches to a mounting member 14. A rubber gasket 16 is provided to form an environmental seal between the member 14 and the cover 12.

A hollow rectangular member 18 is secured to the mounting member 14 for receiving one end of a fiber optic cable 20. The members 14 and 18 may be a single integral piece. The cable 20 extends through a gland 22 which is environmentally connected to one end of the rectangular member 18 by a nut 24.

The fiber optic cable 20 has a jacket 26, preferably made of polyurethane, which surrounds two optical fibers 28. A buffer tube 30 surrounds each optical fiber 28 to aid in preventing the optical fibers from being damaged when they are looped or otherwise bent within the cable 20 or connector 10. A strength member 32 extends through the center of the cable 20 and is looped around an annular extension 34 secured to the mounting member 14. The strength member 32 is rigidly secured to the member 14 by a screw 36. The strength member may be a Kevlar fiber, an Aramid fiber, a high tensile strength plastic fiber, or the like and is provided to prevent the "pistoning" effect inherent in fiber optic cables.

Each end of the cable 20 also includes four twisted pair wires 38 for carrying the analog output signals of four sensor geophone groups, as more fully discussed below in connection with FIG. 7. The four twisted pair wires 38 are soldered or otherwise connected to eight connections of a sixty-one pin electrical connector or plug 40, which is secured to the mounting member 14 at the end opposite the rectangular member 18. The electrical connector 40 may be of any conventional type such as that manufactured by Bendix. A filler material 42, such as Kavlar filler, is provided within the fiber optic cable 20. In the presently preferred embodiment, the twisted pairs 38 and buffer tubes 30 (containing the optical fibers 28) are helically wound around the strength member 32 to provide additional cable flexibility and to aid in relieving tension and compression forces on the fibers.

As shown, one of the optical fibers 28 is terminated in a fiber optic transmitter module 44 through a fiber optic connector 46. The fiber optic connector may be any conventional type, such as a Radiall Model No. F706.015.000, while the optical transmitter module 44 may be any conventional type such as Model No. SPX 4140 manufactured by Spectronics.

The second of the optical fibers 28 is terminated through an optic connector 46 in an optical detector 48. Both the photodetector 48 and the optical transmitter 44 are mounted on a printed circuit board assembly (PCB) 50, which is secured to the mounting member 14. The PCB 50 contains transistor-transistor logic (TTL) circuits which activate the transceiver as more fully discussed below in connection with FIGS. 3 and 4. The PCB 50 is connected to the plug 40 by a plurality of wires (not shown), as discussed below.

When assembled, the cable connector/transceiver 10 provides an environmentally sealed optical cable connector which protects the transceiver and the ends of the optical fibers from being affected or damaged during field use. The connector is readily connectable to a remote seismic data gathering unit or box (FIG. 7) via the plug 40. A lever or wrench 52 enables the connector 10 to be locked into place when plugged into a box.

Referring now to FIG. 3, an electrical schematic diagram of the optical transmitter module is shown. The fiber optic transmitter 44 includes AND gate 62, acting as a buffer, connected to the base of an N-P-N transistor 64 over line 66. The emitter of transistor 64 is grounded through a resistor 68. The collector of transistor 64 is connected over line 70 to a light emitting diode (LED) 72. A pullup resistor 78 is provided to eliminate the parasitic capacitance created by the electrical connection to the remote unit (FIG. 7).

In operation, the output of buffer 62 goes high, i.e., the output becomes a logic 1, when a digital signal appears on line 82, turning on transistor 64. The LED 72 is energized and transmits light energy over one of the optical fibers.

Referring now to FIG. 4, an electrical schematic diagram of the photodetector amplification circuit is depicted. A photodiode 88 is connected to a fiber optic receiver integrated circuit (IC) or preamplifier 90. The preamplifier 90 may be a Spectronics Model No. SPX 3620 or the equivalent. As light energy strikes photodiode 88, a bias current feeding into pin 1 of preamplifier 90 is modulated. The bias current is converted into a voltage signal within the preamplifier 90, and the voltage signal is compared to a threshold voltage level. When the threshold voltage is exceeded, a logic 1 appears at pin 12 of the preamplifier. The preamplifier IC contains an automatic gain control (AGC) circuit which gain ranges the voltage signal represenatative of the light energy striking the photodiode 88.

A voltage holding capacitor 96 is provided to decrease or increase the AGC voltage as required. An AGC override circuit 98 is provided to limit the AGC gain to levels which will not result in noise amplification sufficiently high enough to produce false logic outputs. A transistor 104 is switched on by a low level signal $\overline{\text{AGC Control}}$ at its base. This enables the AGC override 98 to affect the receiver 90 gain. The override is only enabled at times when no data in light form is present at the photodiode 88. Immediately upon receipt of valid data, the transistor 104 is switched off to allow the receiver 90 to gain range to the optimum level for proper data reception.

The output of the fiber optic receiver IC 90 (pin 12) is connected to a non-inverting input of a voltage comparator 120 through a high frequency filtering resistor 122. A symmetry restoration circuit 124 is connected to the inverting input of comparator 120. The symmetry restoration circuit is provided to restore the digital output of IC 90 which may be distorted by line capacitance.

FIG. 5A is an example of a digital signal as it should appear when transmitted from the connector/transceiver 10 to a remote unit (FIG. 7). Because of wire line capacitances, digital propagation delays, and optical fiber pulse stretching, the digital signal may become distorted. FIG. 5B shows the digital signal as it would appear if affected by capacitance. The symmetry restoration circuit 124 restores the distorted digital signal to its original condition, as shown in FIG. 5C. This is accomplished by a feedback loop which detects unsymmetrical data within the remote unit and generates a correction voltage to be applied at TT6 (FIG. 4).

Figure 6:
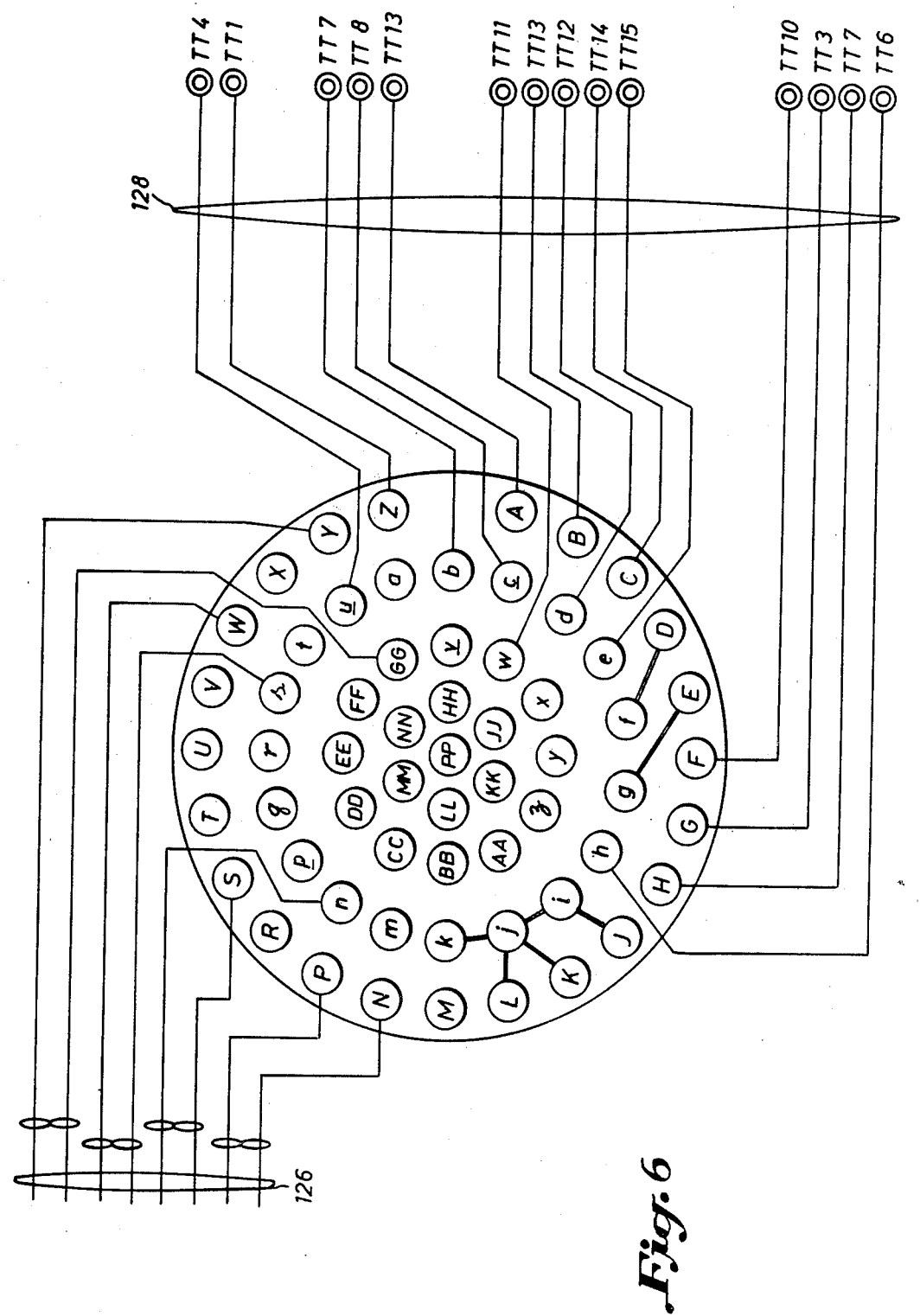
FIG. 6 is a mechanical schematic of a connector which is used in conjunction with the connector/transceiver of FIG. 1.

Referring to FIG. 6, shown is a mechanical schematic diagram of the plug 40. Lines 126 indicate the connections for the twisted pair wires 38 (FIG. 2). Lines 128 correspond to the electrical connections between the plug 40 and various points in the circuits of FIGS. 3 and 4, as indicated by the alphanumerals.

FIG. 7 is a block diagram of a seismic exploration system 130 utilizing the optical fiber cable connector/transceiver 10 of the present invention. As shown, remote units 132 and recorder takeout unit 134 are interconnected through the dual fiber optical cables 20 by the connectors 10. The cables may have eight takeouts 136 for connecting the geophone groups 138. Utilization of the takeouts in the cables 20 is practical, as unwanted cross-over signals are not a problem in fiber optic cables. The recorder takeout unit 134 may be placed anywhere within the array of interconnected remote units. A central control unit 140 is connected to the recorder takeout unit 134.

In operation, a digital control signal may be transmitted from the central control unit 140 to the recorder takeout unit 134. The recorder takeout unit then transmits the digital signal to all the remote units by utilizing the digital connector/transceiver 10 of the present invention. The digital signal is electrically transmitted to the transceivers within the connectors 10d and 10e. The digital signal is converted into light energy by the fiber optic transmitter 44 within each connector. The light energy representing the digital command signal is then transmitted to the adjacent transceivers 10c and 10f, respectively, over one of the optical fibers 28 in the cables 20. The light energy is detected by photodiodes 88 within the connectors 10c and 10f. The light signal is transformed back into a digital signal, which is electrically transmitted to the remote units 132b and 132c. The remote units then sense the digital command signal to see if it applies to them and electrically transmit the digital signals to the connector/transceivers 10b and 10g. The optical fiber transmitters 44 within the connectors 10b and 10g convert the digital command signal into light energy which is transmitted to the next adjacent connector/transceivers 10a and 10h, respectively, through the cables 20. The process is then repeated.

Regarding data transmission, the analog output signals of the geophone groups 138 are transmitted to the remote units 132 over the twisted pair wires 38 which are connected to the takeouts 136. In operation, seismic analog data is received by remote unit 132B, for example. Remote unit 132B transforms the analog data into digital data, which is then electrically transmitted to connector/transceiver 10c. The digital data is transformed into light energy by the optical transmitter 44 in connector 10c. The data is optically transmitted over cable 20b to connector/transceiver 10d, where it is received by photodetector 48. The photodetector transforms the optical data back into its digital electrical state and transmits the digital data to the recording takeout unit 134.

As the remote seismic data system is nonpolarized, it does not matter which end of the cable 20 is connected to a remote unit. Once a cable is interconnected between two remote units, one of the optical fibers will only carry control signals while the other fiber will only carry seismic data signals. The cable 20 may carry control data and seismic data (in opposite directions) simultaneously, thereby operating as a digital full duplex system.

It is to be understood that the invention will admit of other embodiments, such as a system using a single fiber bi-directional link. The description of the preferred embodiment is given only to facilitate understanding of the invention by those skilled in the art and should not be construed as limiting the invention itself which is defined herein by the appended claims.

What is claimed is:

1. A fiber optic cable connector for use with a dual fiber cable in a seismic exploration system, comprising:
    a digital, logic compatible optical transceiver including an optical detector connected to one fiber of the cable and a fiber optic transmitter connected to the second fiber;
    an environmentally sealed case for housing the digital transceiver, the case having means for receiving one end of the fiber optic cable;
    means for connecting the optical fibers to the digital transceiver; and
    means for electrically connecting the transceiver in the seismic exploration system.

2. The cable connector as defined in claim 1, wherein the optical detector includes a photodiode and a fiber optic receiver integrated circuit associated with the photodiode and having a digital, logic compatible output.

3. The cable connector as defined in claim 2, wherein the optical detector further includes an automatic gain control circuit.

4. The cable connector as defined in claim 2, wherein the optical detector further includes a symmetry restoration circuit associated with the digital output of the receiver circuit.

5. The cable connector as defined in claim 3, wherein the automatic gain control circuit is associated with a holding voltage capacitor and an automatic gain control override circuit for eliminating the effects of noise.

6. The cable connector as defined in claim 4, wherein the symmetry restoration circuit includes a voltage comparator for correcting the duration of the digital output signals of the receiver integrated circuit.

7. The cable connector as defined in claim 1, wherein the fiber optic transmitter includes a light emitting diode and circuitry for energizing the light emitting diode.

8. The cable connector as defined in claim 1, wherein the electrical connecting means includes a multiple pin electrical connector connected to the digital transceiver and a self-locking wrench for securing the electrical connector.

9. A fiber optic cable connector for use with a dual fiber cable in a land seismic exploration system, comprising:
    a digital, logic compatible optical transceiver including optical detection circuitry adapted to be connected to one fiber of the dual fiber cable and optical transmission circuitry adapted to be connected to the second fiber of the dual fiber cable, said detection circuitry being further adapted to transform an optical signal into a digital, logic compatible electrical signal, and said transmission circuitry being further adapted to transform a digital, logic compatible electrical signal into an optical signal;
    an environmentally sealed case for housing said digital transceiver, said case having means for receiving one end of the dual fiber cable;
    means for connecting the optical fibers to said digital transceiver; and
    means for electrically connecting said digital transceiver in the land seismic exploration system.

* * * * *